(12) United States Patent
Ibaragi

(10) Patent No.: US 6,171,540 B1
(45) Date of Patent: *Jan. 9, 2001

(54) METHOD OF MAKING A PLASTIC ANGLE BRACKET

(75) Inventor: Shigenari Ibaragi, Rochester Hills, MI (US)

(73) Assignee: Eagle Technology & Mfg., Inc., Roseville, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/086,131

(22) Filed: May 27, 1998

(51) Int. Cl.⁷ .................................................. B29C 45/00
(52) U.S. Cl. .................. 264/328.1; 248/674; 248/200; 248/903
(58) Field of Search .................... 248/548, 909, 248/903, 200, 248, 674; 264/40.1, 328.1, 328.12, 328.18

(56) References Cited

U.S. PATENT DOCUMENTS

| | | | |
|---|---|---|---|
| D. 400,081 | * 10/1998 | Ibaragi | D8/354 |
| 2,217,788 | * 10/1940 | Blake | 248/577 |
| 3,385,557 | 5/1968 | Rambelle . | |
| 3,644,271 | * 2/1972 | Tulley | 264/328.18 |
| 3,830,033 | 8/1974 | Gahler . | |
| 4,120,446 | * 10/1978 | Fuemmeler . | |
| 4,269,384 | * 5/1981 | Saeed et al. | 248/548 |
| 4,403,933 | * 9/1983 | Davis et al. | 264/328.9 |
| 4,489,500 | 12/1984 | Valat . | |
| 4,630,811 | 12/1986 | Rudisill . | |
| 4,703,919 | 11/1987 | Drake et al. . | |
| 4,968,012 | 11/1990 | Haddad et al. . | |
| 4,994,220 | * 2/1991 | Gutjahr et al. | 264/328.12 |
| 5,085,396 | 2/1992 | Mansson . | |
| 5,106,050 | 4/1992 | Vaccaro et al. . | |
| 5,269,565 | * 12/1993 | Langner | 285/2 |
| 5,333,432 | * 8/1994 | Schluter | 52/396.1 |
| 5,481,835 | * 1/1996 | Bloom | 52/98 |
| 5,547,161 | 8/1996 | Gleich et al. . | |
| 5,839,309 | * 11/1998 | Fantl et al. | 70/493 |
| 5,890,273 | * 3/1999 | Haytayan | 29/426.4 |

OTHER PUBLICATIONS

Rosato et al., Injection Molding Handbook, second edition, pp. 595–599, 627–629, 1995.*
Hiramatsu Design Standard: Standard Locator Construction (HMS 00740).

* cited by examiner

Primary Examiner—Jill L. Heitbrink
(74) Attorney, Agent, or Firm—Brooks & Kushman P.C.

(57) ABSTRACT

An angle bracket having a base leg and a perpendicular leg and are connected by a plurality of reinforcing ribs is disclosed. The reinforcing ribs have a partially parabolic outer edge. The angle bracket may be assembled to a tool base to support a tool element in a spaced relationship. The angle bracket is manufactured by an injection molding process wherein high strength polymer resin and fiber reinforcing materials such as glass fiber or carbon fiber may be molded to form an angle bracket in a single molding step.

3 Claims, 2 Drawing Sheets

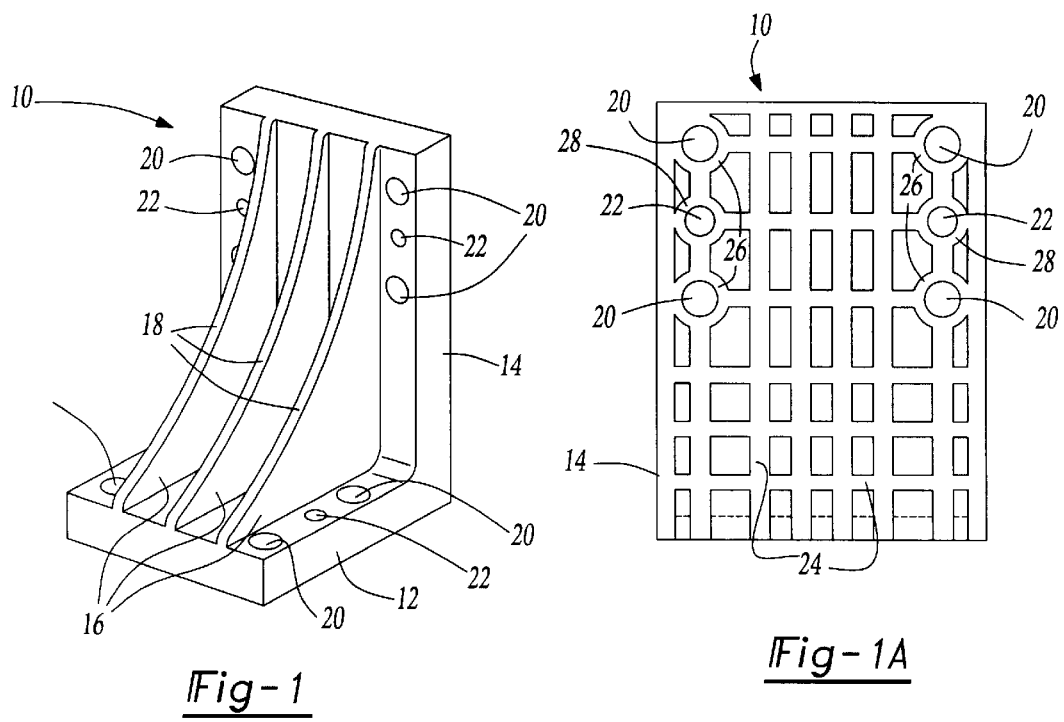
Fig-1
Fig-1A
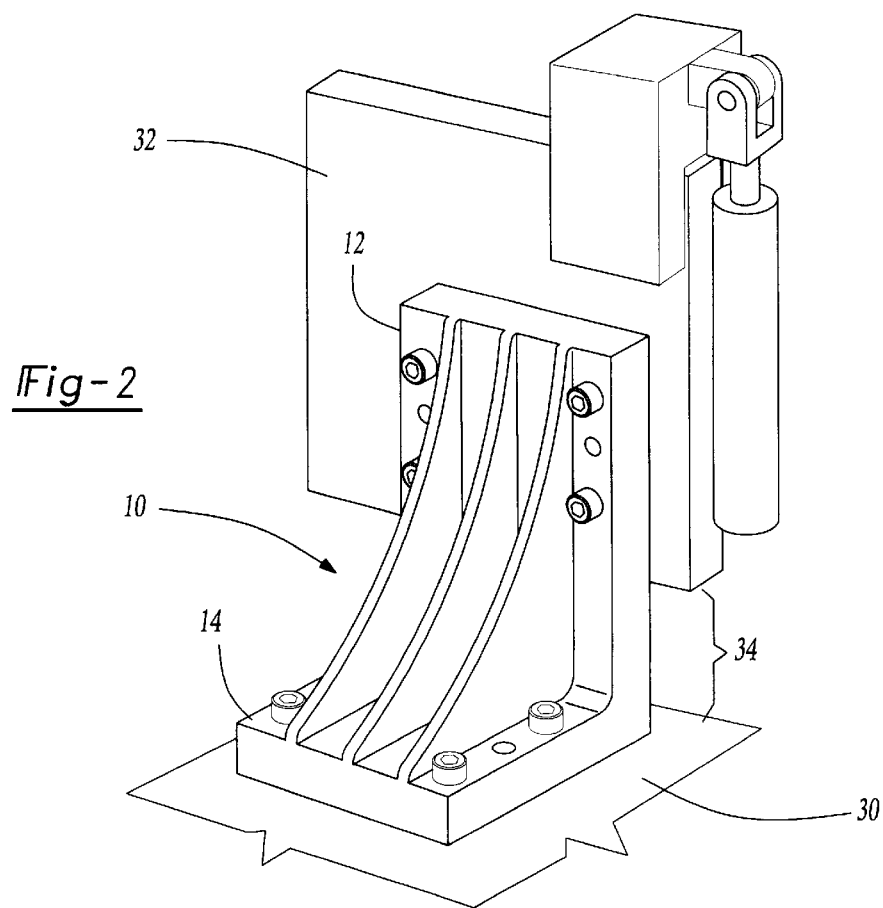
Fig-2

METHOD OF MAKING A PLASTIC ANGLE BRACKET

TECHNICAL FIELD

The present invention is related to a bracket for holding a tool element forming part of a fixture.

BACKGROUND ART

Angle brackets are used in the making of tools and quality control fixtures to support a wide variety of items on a tool bed or other fixture. Angle brackets are typically made of steel or iron for strength and durability. For example, U.S. Pat. No. 4,489,500 to Valet, discloses a multipurpose angle bracket made of steel that is formed by either casting or by mechanical assembly and welding. U.S. Pat. No. 4,968,012 to Haddad, discloses a workpiece holding apparatus used to check part dimensions. The Haddad patent discloses a base that is cast as a single integral element and subsequently machined to a generally cubical configuration.

A problem with such prior art angle brackets is that metal brackets add to the weight of the tooling. They also require machining and finishing steps that add to the cost of manufacturing. Metal brackets are also costly to replace.

Angle brackets are used to support tool elements that are designed to withstand normal loads applied in a predetermined manner. If metal angle brackets are subjected to a side impact or other unintended load, they may become distorted or bent and the force of impact may be transferred to the tool necessitating repair of the tool. If a substantial unintended load is applied to the tool, damage may be caused to expensive tooling parts supported by the angle bracket.

The electrical conductivity of metal angle brackets can cause problems if there is an electrical malfunction of the equipment to which the bracket is attached. Metal angle brackets do not isolate tooling elements from the base and will not prevent short circuiting through the angle brackets.

SUMMARY OF THE INVENTION

The present invention is directed to overcoming one or more of the problems described above and provides a bracket fixture which is made of a reinforced light weight polymeric material that is comparable in strength to steel angle bracket fixtures.

The method of making an angle bracket of the present invention offers the advantage of providing a molded fiber reinforced member that is formed in an injection molding process that does not require machining or surface finishing. The molded angle bracket is formed to its final dimensional size and shape in a single molding step.

It is another object of the present invention to provide a bracket that may be produced in a single molding step that does not require machining or assembly.

According to the present invention, an angle bracket is provided for holding tooling elements formed generally of a first material in a fixed relationship relative to each other. The angle bracket is formed by a molding process to have a base leg and a perpendicular leg that hold the tooling element in a spaced relationship relative to a base.

According to the method of the present invention, a method of making an angle bracket is provided wherein a polymer and fiber reinforcement mixture is supplied to an injection molding machine. The mixture is heated to a predetermined molding temperature. The injection molding die is closed, the heated mixture is injected into the mold and initially cured. The die is opened and the angle bracket is removed from the mold. The angle bracket is then held for final curing and inspected. The angle bracket is ready for installation on a tooling fixture without other assembly or finishing steps required for the angle bracket.

These and other objects and advantages of the invention will be apparent to one of ordinary skill in the art in light of the attached drawings and following detailed description of a preferred embodiment of the present invention.

BRIEF DESCRIPTION OF THE DRAWINGS

FIG. 1 is a perspective view of a frangible angle bracket made in accordance with the present invention;

FIG. 1A is a bottom view of FIG. 1;

FIG. 2 is a perspective view showing an angle bracket fixture made in accordance with the present invention supporting a tool element on a base;

BEST MODE FOR CARRYING OUT THE INVENTION

Figure 3:
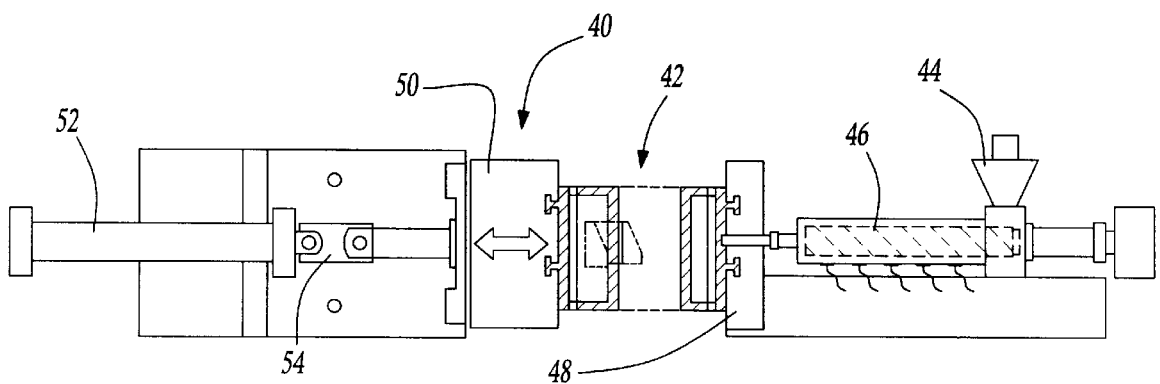
FIG. 3 is a diagrammatic view of an injection molding apparatus used in accordance with the method of the present invention.

Referring now to FIG. 1, the angle bracket 10 having a base leg 12 and a perpendicular leg 14 is shown. The base leg 12 and perpendicular leg 14 are molded in one piece and form a right angle relative to each other. Three reinforcing ribs 16 join the base leg 12 and perpendicular leg 14 on the interior angle of the right angle. The reinforcing ribs 16 have a partially parabolic edge 18 on their exterior side. Reinforcing ribs 16 provide added strength to the angle bracket 10 and are formed in the same molding step as a base leg 12 and perpendicular leg 14.

The base leg 12 and perpendicular leg 14 include a plurality of fastener holes 20 in which fasteners are received. A plurality of pin bores 22 are also provided. The base leg 12 and perpendicular leg 14 also include a plurality of body ribs 24 that support and reinforce the base leg 12 and perpendicular leg 14. In conjunction with the body ribs 24, fastener bosses 26 and pin bosses 28 are provided in both the base leg 12 and perpendicular leg 14.

Referring now to FIG. 2, the angle bracket 10 is shown assembled to a tool base 30. A tool element 32 is secured by fasteners to a tool element 32 in a spaced relationship relative to the tool base 30.

Angle bracket 10 is formed of a fiber reinforced high strength polymer such as Hevex or Celstran. The fiber reinforcement may be either glass fiber or carbon fiber. The tool base 30 is generally a steel member and the tool element 32 is most likely formed of steel or aluminum or a combination of materials. The faces of the tool base 30 and tool element 32 that are secured to the base leg 12 and perpendicular leg 14, respectively, function to support and reinforce the angle bracket 10 on the portions of the base leg 12 and perpendicular leg 14 to which they are secured.

The angle bracket 10 of the present invention may be designed to provide the following characteristics in comparison to prior art steel angle brackets:

| COMPOSITE ANGLE BRACKET COMPARISON | | | |
|---|---|---|---|
| CATEGORY | STEEL | PG - A/BRKT GLASS COMP | PC - A/BRKT CARBON COMP |
| ACCURACY GUARANTEE | | | |
| STRENGTH | | | |
| WELD SPLATTER ADHESION | HIGH | LOW | LOW |
| OIL RESISTANCE | GOOD | GOOD | GOOD |
| RUST/MAINTENANCE REQ'D | YES/YES | NO/NO | NO/NO |
| CONDUCTIVITY- ELECTRIC | HIGH | NONE | SLIGHT |
| WEIGHT | HEAVY | LIGHT | LIGHTEST |
| PRODUCTION RATE - availability | LOW | HIGH | HIGH |
| MACHINING QUALITY | GOOD | GOOD | GOOD |
| PAINT ADHESION | GOOD | GOOD | GOOD |
| CLEANING - for painting | REQ'D | NOT REQ'D | NOT REQ'D |
| COST | HIGH | LOWEST | LOW |

The materials used for forming the angle bracket fixture may include either Celstran or Hevex polymer resin. The fiber reinforcement may be carbon fiber preferably of the grade PPSC 40-01-4. The glass fiber is preferably of the grade PPSG 50-01-4. The angle bracket is formed completely in an injection molding process that requires no machining or other process steps post molding. In addition, glass fiber reinforced plastic is believed to provide a significant cost reduction compared to forming the angle brackets from steel utilizing conventional manufacturing techniques. If the angle bracket is formed of carbon fiber reinforced plastic the cost compared to conventional steel angle brackets is slightly reduced but higher strength is obtained. Angle brackets made according to the present invention also provide substantial weight savings to conventional steel angle brackets.

Figure 4:
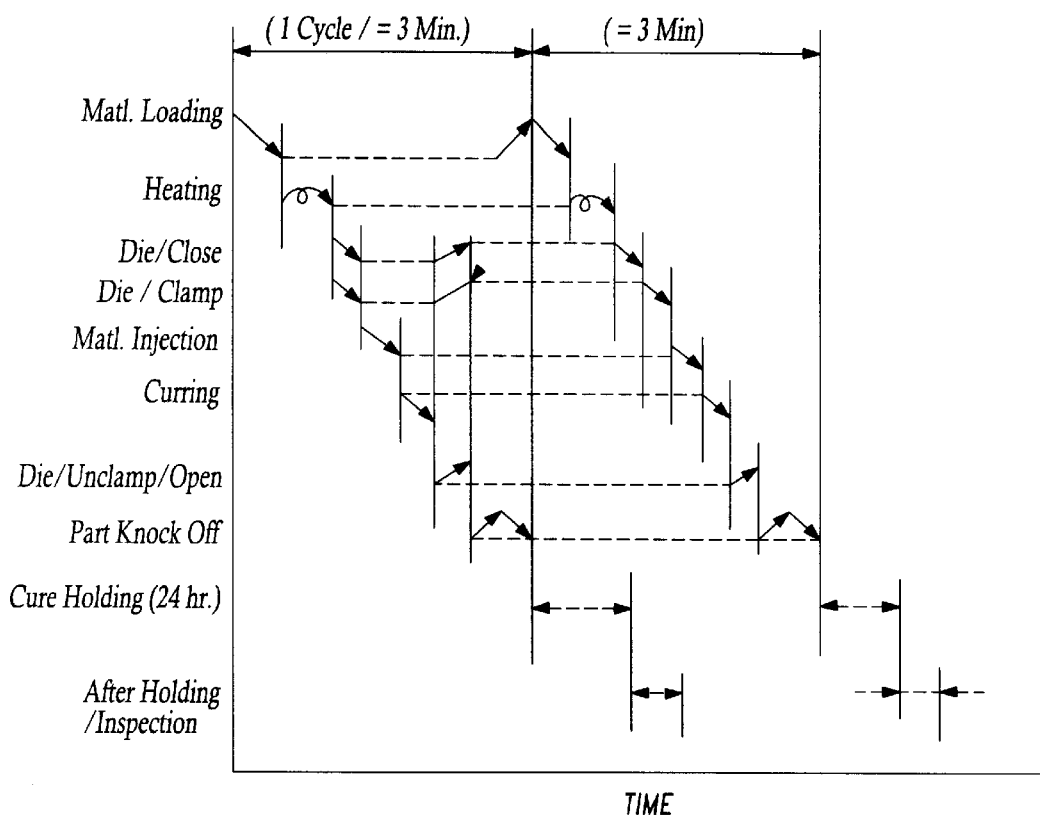
FIG. 4 is a machine cycle diagram showing the machine cycle for making an angle bracket fixture according to the method of the present invention.

Referring now to FIGS. 3 and 4 the injection molding process used to form angle brackets according to the present invention will be described in detail. An injection molding machine 40 includes an injection molding die set 42 that is used to mold the angle bracket. The injection molding machine 40 includes a hopper 44 into which pelletized, fiber, or particulate form polymer and fiber materials are introduced into the injection molding machine 40. The polymer and fiber materials are then provided to a heating chamber 46. The materials are then advanced through the heating chamber while being heated and are injected through a stationary die holder 48 and into the injection molding die set 42. The injection molding die set 42 is closed by a power die holder 50 that is actuated by a hydraulic cylinder 52 and is clamped in place by means of a mechanical clamp 54. After the molded part is formed, the part is ejected out of the injection molding die set 42.

The process of the invention includes the step of feeding pelletized powder or fiber material into the hopper 44. The material is then heated in the heating chamber 46. The injection molding die set 42 is then closed and clamped by the hydraulic cylinder 52 closing a power die holder 50 against the stationary die holder 48. The mechanical clamp 54 clamps the injection molding die set closed. After heating, the thermoplastic resin is melted and then injected into the closed and clamped injection molding die set 42. The injection molding die set is then cooled for approximately two minutes to allow the molded part to partially cure whereupon the injection molding die set 42 is opened and the part is ejected from the injection molding die set 42. After ejection the molded part is allowed to cure at room temperature for approximately 24 hours thereby completing the manufacturing process of the angle bracket. The part may then be inspected to verify compliance with manufacturing tolerances.

The angle bracket of the present invention is manufactured by a fully automatic injection molding process that can create a finished part without any post molding machining operations.

The angle bracket in the present invention may be formed in various configurations and sizes. For example, angle bracket fixtures have been made in 200 mm, 400 mm and 600 mm sizes.

The preceding description represents the best mode of the present invention. The preceding description is intended as an example and should not be read in a limiting sense. The broad scope of the present invention should be construed by reference to the following claims.

What is claimed is:

1. A method of manufacturing an angle bracket comprising:

providing an injection molding die configured to form a base leg and a perpendicular leg that are connected at a right angle and at least one rib formed on the interior of the right angle formed by the base leg and the perpendicular leg, the rib having a partially parabolic outer edge, said injection molding die also being configured to form a plurality of body ribs on the opposite side of the base leg and perpendicular leg from the at least one partially parabolic rib that support and reinforce the base leg and the perpendicular leg;

supplying a mixture of a polymer resin and a fiber reinforcement composition to an injection molding machine having an injection molding die;

heating the mixture to a predetermined molding temperature;

closing the injection molding die;

clamping the injection molding die;

injecting the heated mixture into the injection molding die, filling the at least one rib and the body ribs while forming the base leg and perpendicular leg;

cooling the mixture in the injection molding die to partially cure the mixture to a molded part in a rigid state;

removing the molded part from the injection molding die; and curing the molded part.

2. The method of claim 1 further including the step of inspecting the molded part after the curing step.

3. The method of claim 1 wherein the injection molding die is configured to form fastener bosses and pin bosses around fastener bores and pin bores, respectively, that are formed in the base leg and perpendicular leg of the angle bracket fixture.

* * * * *